Nov. 29, 1966  S. E. BOLLDÉN ETAL  3,288,523
DRIVER'S SEATS FOR TRACTORS
Filed April 17, 1964  5 Sheets-Sheet 4

Nov. 29, 1966    S. E. BOLLDÉN ETAL    3,288,523
DRIVER'S SEATS FOR TRACTORS

Filed April 17, 1964    5 Sheets-Sheet 5

United States Patent Office 3,288,523
Patented Nov. 29, 1966

3,288,523
DRIVER'S SEATS FOR TRACTORS
Sven Erik Bolldén, Backagatan 4B, Norrkoping, Sweden, and John Elis Vifot, Kyrkogatan 29, Skurup, Sweden
Filed Apr. 17, 1964, Ser. No. 360,666
Claims priority, application Sweden, June 7, 1963, 6,321/63
3 Claims. (Cl. 296—65)

This invention relates to driver's seats for use with tractors and to tractors having such seats.

Particular attention is being paid to the well-known fact that after some time many tractor drivers will experience severe pains in their backs. It has been tried to prevent the occurrence of such pains by suggesting special constructions for the spring suspension of the driver's seats but one did not succeed in eliminating the pains experienced which must be attributed to the tense, very tiring and extremely unsuitable position the driver takes when ploughing a field, the right-hand wheel pair of the tractor being driven in the plough-furrow earlier made and thus constantly rolling 200 to 250 mm. lower than does the left-hand wheel pair. This implies that in a tractor having a wheel gauge of 1350 mm. the tractor seat will be inclined an angle of 8 or 9° to the horizontal. The tractor driver automatically tries to maintain a vertical position and therefore turns the upper body to the left, which produces pains and tiredness.

According to the present invention these drawbacks are eliminated in that the driver's seat of a tractor is pivotally mounted about a longitudinal axis of the tractor and has means for adjusting the seat into different positions of inclination. The setting mechanism preferably is dependent upon the adjusted position of a power hitch for an implement coupled to the tractor, the seat preferably remaining uninclined relative to the tractor as long as the lifting appliance is above a certain adjusted position corresponding to the propulsion of implements substantially at ground level and being inclined only when the power hitch is moved down below said adjusted position in connection with the use of implements having considerable working depths.

These and further features of the invention and the advantages gained therewith will be further elucidated in the course of the following description in which reference is made to the accompanying drawings. In the drawings.

Figure 1:
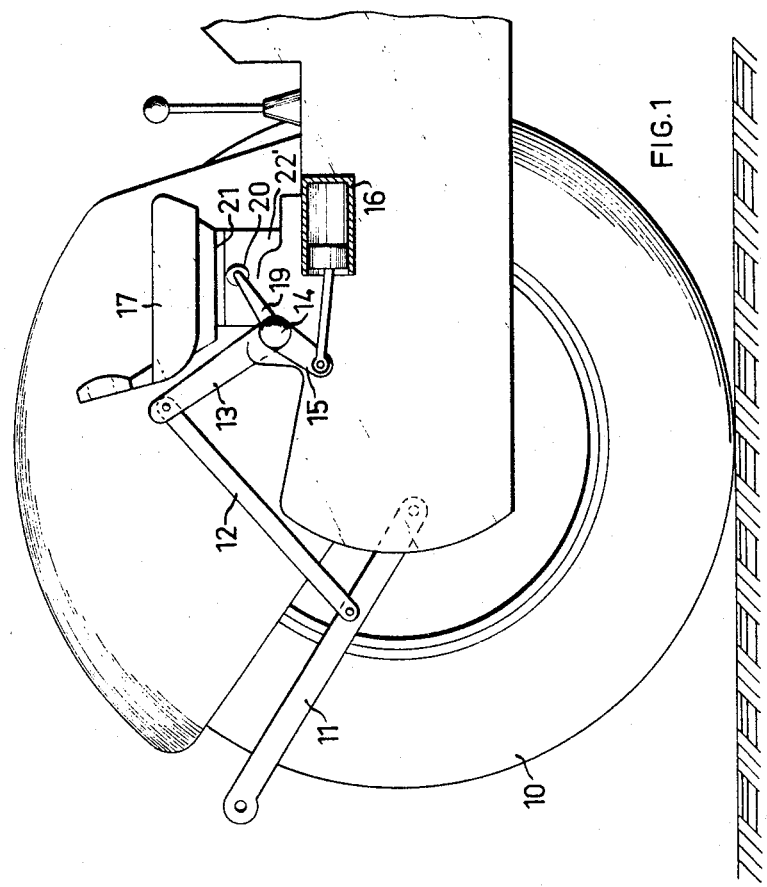
FIG. 1 is a diagrammatic side elevational view partly in longitudinal section, of part of a tractor.

Pivotally mounted between the rear wheels 10 of the tractor are two hitch arms 11 which are adapted for connection to an implement and are coupled by means of links 12 to swing arms 13 on a shaft 14 which in turn is connected by means of an arm 15 to a hydraulic cylinder 16. So far the tractor is of a conventional construction.

Figure 3:
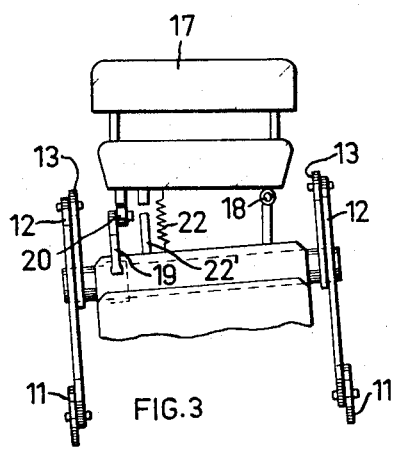
FIG. 3 is a front view of the driver's seat and the operating mechanism thereof, with the tractor inclining as in FIG. 2.
Figure 5:
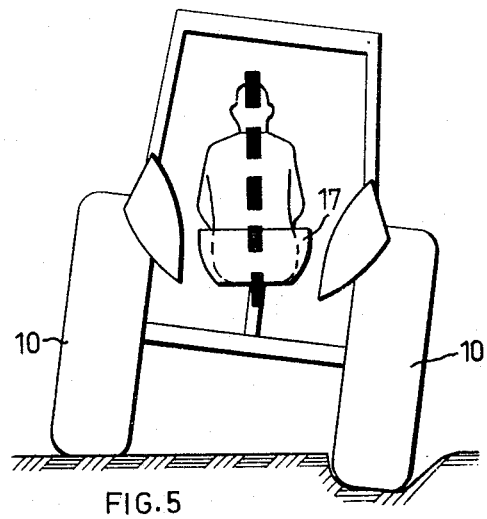
FIG. 5 is a view similar to that of FIG. 4, but of a tractor having the driver's seat adjustable according to the invention.
Figure 4:
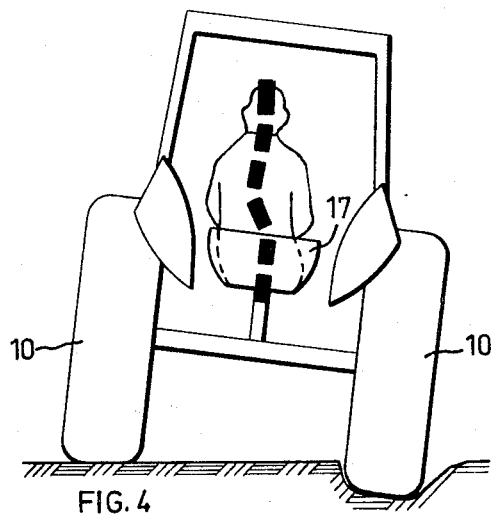
FIG. 4 is a rear view of a tractor with driver during ploughing, in which tractor the driver's seat cannot be adjusted in the manner suggested by the present invention.

According to the invention, the driver's seat 17 is pivotally mounted at the left side thereof to pivot about an axis 18 extending longitudinally of the tractor. Mounted on the shaft 14 is a further arm 19 which is provided at the outer end with a cam follower 20 and adapted to be pressed with this cam follower against a cam path 21 beneath the seat at the right side thereof. Normally, however, the seat is kept pressed by a spring 22 against a fixed abutment 22', in which case the seat does not make an angle with the tractor: if the tractor takes a horizontal position in the transverse direction, the seat is also horizontal. When the hitch arms 11 are swung down below a predetermined angular position which is suitable for implements to be propelled at ground level the cam follower 20, however, will bear against the cam path 21 lifting the right side of the seat against the action of the spring 22 to a certain position of inclination, as shown in FIG. 3, the seat being inclined proportionally to the movement of the hitch arms down below the said predetermined angular position. On ploughing with a plough connected to the hitch arms the plough enters the soil and the deeper it enters the more the hitch arms are swung down below the said predetermined position. The inclination of the driver's seat 17 will thus be dependent on the ploughing depth, and the length and the angular position of the arm 19 on the shaft 14 are so adapted that the seat is kept horizontal also when the tractor travels with one wheel pair in a plough-furrow, that is, with one wheel pair so much lower as approximately corresponds to the ploughing depth, 200 to 250 mm. This is diagrammatically shown in FIGS. 4 and 5, of which FIG. 4 elucidates the conditions in the event that the driver's seat 17 is not adjustable in the manner suggested by the present invention. When the right wheel 10 of the tractor runs in a plough-furrow the entire tractor including the driver's seat will incline to the right, the driver taking an oblique position and attempting, consciously or subconsciously, to sit erect in his seat whereby he will take a very tense, inconvenient and tiring position with his spine deformed approximately in the way indicated by the coarse broken line. That the driver will be suffering from severe pains in his back is quite obvious. When the driver's seat is adjustable in the manner suggested by the present invention it can be maintained horizontal independent of the inclination of the tractor, FIG. 5, and the tractor driver can sit erect with straight spine as indicated by the coarse broken line in FIG. 5.

Figure 2:
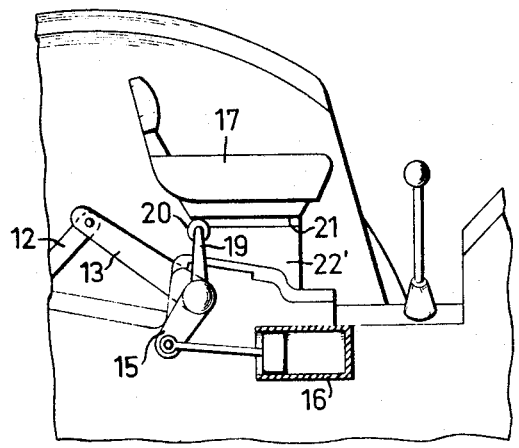
FIG. 2 is a fragmentary view similar to that of FIG. 1 with the tractor inclining toward one side.

The arm 19 with the cam follower 20 can also act at the left side of the driver's seat 17, but in such a case it is adapted to lower that side of the seat when the hitch arms 11 go down below the said angular position. Further, it is possible to dispose the pivot axis 18 of the seat substantially at the centre thereof. To satisfy the requirements upon utilisation of so-called reversible ploughs, with which the tractor is driven alternately with the wheels of the right side and the wheels of the left side in the plough-furrow, the driver's seat may in the latter case be adjustable into different positions of inclination optionally toward one or the other side. The transmission between the hitch arms and the seat can be arranged in a manner other than that shown in FIGS. 1–3. Some further examples are shown in FIGS. 6–9.

Figure 6:
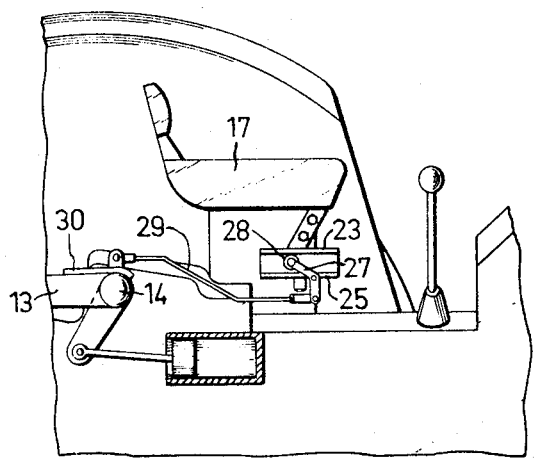
FIG. 6 is a fragmentary view similar to that of FIG. 2 of a modified embodiment of the operative connection between the hitch arms and the driver's seat.
Figure 7:
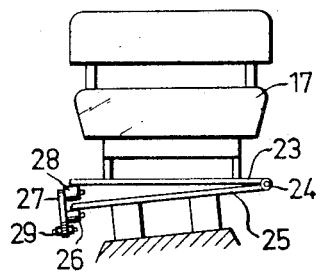
FIG. 7 is a front view similar to that of FIG. 3 of the driver's seat shown in FIG. 6.

In the form shown in FIG. 6 the distance between the shaft 14 and the driver's seat 17 is so large that the actuation of the seat cannot very well be effected directly by means of an arm on the shaft 14, on which the swing arms 13 are located. In this form the seat 17 is disposed on one flap or plate 23 of a hinge having its pivot axis 24 extending longitudinally of the tractor while the other flap or plate 25 of the hinge is secured to the tractor chassis replacing the abutment 22' in FIGS. 1–3. Such a hinge can readily be provided in a tractor in which the driver's seat originally was stationarily mounted on the chassis. Disposed on the hinge plate 25 also is a bearing 26 for a bellcrank lever 27 which can be pressed with a cam follower 28 on one lever arm against the underside of the hinge plate 23 while the other lever arm is hingedly connected with one end of a link 29 which has its one end hinged to a fitting 30 attached to one swing arm 13. The operation is exactly the same as in the earlier described form, the only difference being that the movement from the shaft 14 is transmitted to the driver's seat via a link.

Figure 8:
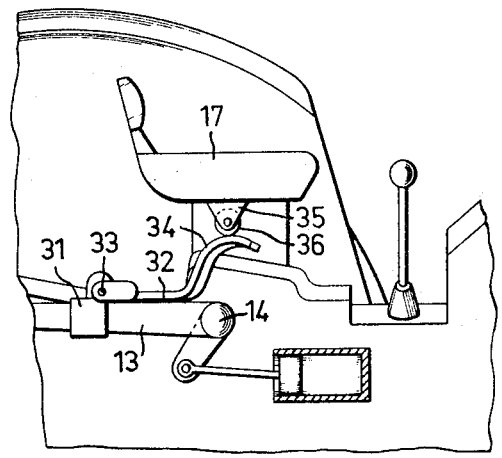
FIG. 8 is a fragmentary view similar to that of FIG. 2 of a further modification of the operative connection between the hitch arms and the driver's seat.

In the modification shown in FIG. 8 the actuation of the driver's seat 17 is again effected from the shaft 14. In this case a fitting 31 is secured to one swing arm 13 and an arm 32 has its one end mounted at 33 to said fitting 31, while a portion of the free end of the arm 32 is bent to form a cam path 34. The arm 32 normally is supported on the swing arm 13 with its straight portion adjacent the pivotally mounted end. Disposed on the seat 17 is a bearing 35 for a cam follower in the form of a roller 36 which bears against the cam path 34. The latter is so formed as to move the driver's seat 17 via the roller 36 into a position of inclination corresponding to the angular position of the swing arm 13 and thus of the hitch arms. In this instance one has the possibility of adapting the shape of the cam path to the desired relation between the angle of pivotment of the hitch arms (swing arm 13) and the angle of inclination of the seat 17.

After raising the driver's seat by hand the arm 32 can be swung aside counter-clockwise as viewed in FIG. 8 when it is not desired to have the driver's seat adjustable in dependence on the position of pivotment of the hitch arms.

Figure 9:
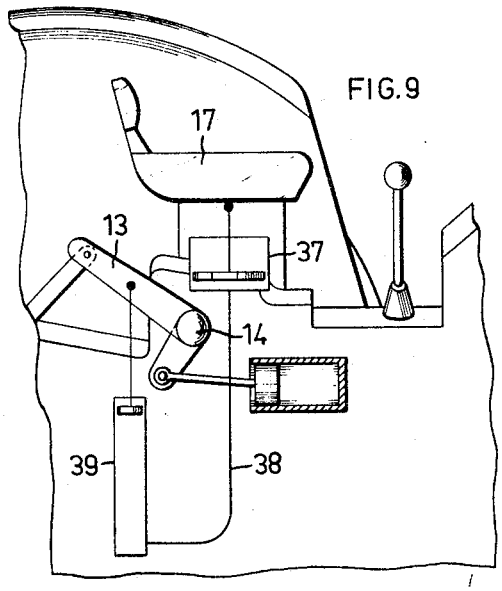
FIG. 9 is a fragmentary view similar to that of FIG. 1 of an embodiment in which the operative connection between the hitch arms and the driver's seat is hydraulic.

An entirely hydraulic embodiment of the invention is schematically shown in FIG. 9. A hydraulic cylinder 37 has its plunger connected to the driver's seat 17 at the movable end thereof. The cylinder space is connected through a conduit 38 to the cylinder space of another hydraulic cylinder 39 the plunger of which is connected to one swing arm 13. The cylinders 37 and 39 form together with the conduit 38 a closed hydraulic system wherein liquid is enclosed. If the swing arm 13 and thereby the hitch arms are lowered, liquid from the cylinder 39 is displaced through conduit 38 to the cylinder 37 the plunger of which is urged in an upward direction for lifting the driver's seat 17. If the swing arm 13 is raised the liquid flows in the opposite direction and the driver's seat is again lowered. The operation thus is the same as in the purely mechanical embodiments of the invention.

The adjustment of the driver's seat need not take place in dependence on the power hitch of the tractor, but can also be effected in dependence on a height or depth regulating device disposed on a towed type implement coupled to a draft hook on the tractor: the hydraulic version of the driver's seat according to the invention will in this case decidedly be the most suitable one. Means are preferably arranged to permit disconnection of the apparatus for the inclination of the seat when this is desired for some reason or other, for example as shown in the form according to FIG. 8.

The forms described above and illustrated in the drawings should not therefore be considered limitative for the invention as they are only meant to exemplify it.

What we claim and desire to secure by Letters Patent is:

1. In a tractor having a power hitch for connection of an implement to the tractor, said power hitch including hitch arms mounted on the tractor of vertical adjustment thereon by pivotal movement of said arms about an axis extending transversely of the tractor, the combination comprising a driver's seat, means mounting said seat on the tractor for pivotal movement in relation to the tractor about an axis extending substantially in the longitudinal direction of the tractor, a first element connected to said power hitch mounted to a move proportionately with the power hitch, a second element connected to the driver's seat and spaced on one side of the pivot axis thereof, said first element located in abutting engagement with said second element when said hitch arms are located between an intermediate position of pivotal movement and a fully pivoted movement, said elements movable with respect to each other whereby said first element is engageable with said second element after an initial lost motion when said power hitch is moved from an upper end position, to raise the driver's seat on said one side of the pivot axis and thereby to tilt the driver's seat from its normal position relative to the tractor about the pivot axis thereof in dependence on and proportionally to continue downward movement of the power hitch below a predetermined adjusted position.

2. The combination as claimed in claim 1 in which said first element comprises a cam member forming a cam path and said second element comprises a cam follower cooperating with said cam path.

3. The combination as claimed in claim 1 in which said first element comprises a projecting arm having a roller rotatably mounted in the free end thereof and said second element comprises a guide member forming a bearing surface to be engaged by said roller.

References Cited by the Examiner

UNITED STATES PATENTS 2,572,910    10/1951    Brown _____ 280—6.1

BENJAMIN HERSH, *Primary Examiner.*

LEO FRIAGLIA, *Examiner.*

P. GOODMAN, *Assistant Examiner.*